US009746961B2

(12) United States Patent
Lee

(10) Patent No.: US 9,746,961 B2
(45) Date of Patent: Aug. 29, 2017

(54) BACKGROUND SIGNAL PROCESSING SYSTEM AND BACKGROUND SIGNAL PROCESSING METHOD

(71) Applicants: APEX MATERIAL TECHNOLOGY CORPORATION, Keelung (TW); IMAGINATION BROADWAY LTD., New Taipei (TW)

(72) Inventor: Shang-Li Lee, Taichung (TW)

(73) Assignees: APEX MATERIAL TECHNOLOGY CORP., Keelung (TW); IMAGINATION BROADWAY LTD., New Taipei (TW)

( * ) Notice: Subject to any disclaimer, the term of this patent is extended or adjusted under 35 U.S.C. 154(b) by 158 days.

(21) Appl. No.: 14/577,319

(22) Filed: Dec. 19, 2014

(65) Prior Publication Data

US 2016/0179282 A1 Jun. 23, 2016

(51) Int. Cl.
G06F 3/041 (2006.01)
G06F 3/044 (2006.01)

(52) U.S. Cl.
CPC ............ G06F 3/0418 (2013.01); G06F 3/044 (2013.01)

(58) Field of Classification Search
None
See application file for complete search history.

(56) References Cited

U.S. PATENT DOCUMENTS

| 9,317,158 | B2 * | 4/2016 | Schwartz | G06F 3/0418 |
| 2008/0047764 | A1 * | 2/2008 | Lee | G08C 21/00 178/18.06 |
| 2008/0277171 | A1 * | 11/2008 | Wright | G06F 1/3203 178/18.06 |
| 2010/0253647 | A1 * | 10/2010 | Agari | G06F 3/044 345/174 |
| 2011/0050620 | A1 * | 3/2011 | Hristov | G06F 3/0416 345/174 |
| 2011/0157076 | A1 * | 6/2011 | Chang | G06F 3/0418 345/174 |
| 2011/0241907 | A1 * | 10/2011 | Cordeiro | G06F 3/0418 341/20 |
| 2012/0026123 | A1 * | 2/2012 | Grunthaner | G06F 3/0418 345/174 |

(Continued)

Primary Examiner — Claire X Pappas
Assistant Examiner — Benjamin Casarez
(74) Attorney, Agent, or Firm — Muncy, Geissler, Olds & Lowe, P.C.

(57) ABSTRACT

A background signal processing method and a background signal processing system are provided. The background signal processing method includes measuring a first conductive wire group, comparing a first background signal measurement value with a predetermined background signal threshold value to determine their difference, and executing the following steps according to the amount of the difference: (1) performing no updating; updating the background signal according to the first background signal measurement value; and further measuring a second conductive wire group and calculating a background signal speculating value of a third conductive wire group, other than the first and second conductive wire groups, based on the second background signal measurement value and the first background signal measurement value, to provide the complete background signals and ensure the quality of the captured signals.

6 Claims, 4 Drawing Sheets

(56) References Cited

U.S. PATENT DOCUMENTS

| | | | |
|---|---|---|---|
| 2012/0050216 A1* | 3/2012 | Kremin | G06F 3/044 345/174 |
| 2012/0056851 A1* | 3/2012 | Chen | G06F 3/0418 345/174 |
| 2012/0162123 A1* | 6/2012 | Kent | G06F 3/044 345/174 |
| 2013/0038573 A1* | 2/2013 | Chang | G06F 3/044 345/174 |
| 2014/0071080 A1* | 3/2014 | Cok | G06F 3/044 345/174 |
| 2014/0071085 A1* | 3/2014 | Kasamatsu | G06F 3/041 345/174 |
| 2014/0092033 A1* | 4/2014 | Chang | G06F 3/0418 345/173 |
| 2014/0125623 A1* | 5/2014 | Atkinson | G06F 3/044 345/174 |
| 2014/0146008 A1* | 5/2014 | Miyahara | G06F 3/0418 345/174 |
| 2014/0160038 A1* | 6/2014 | Lee | G06F 3/044 345/173 |
| 2015/0002459 A1* | 1/2015 | Watanabe | G06F 3/0418 345/174 |
| 2015/0062061 A1* | 3/2015 | Hsu | G06F 3/044 345/174 |
| 2015/0145835 A1* | 5/2015 | Vandermeijden | G06F 3/0416 345/178 |
| 2015/0153900 A1* | 6/2015 | Chang | G06F 3/0418 345/174 |
| 2015/0162932 A1* | 6/2015 | Page | G01R 27/2605 324/658 |
| 2015/0184991 A1* | 7/2015 | Nakabayashi | G06F 3/0418 345/174 |
| 2015/0242054 A1* | 8/2015 | Gao | G06F 3/0418 345/174 |
| 2015/0277648 A1* | 10/2015 | Small | G06F 3/0416 345/174 |
| 2016/0077667 A1* | 3/2016 | Chiang | G06F 3/0418 345/173 |
| 2016/0179227 A1* | 6/2016 | Lee | G06F 3/0418 345/173 |
| 2016/0179228 A1* | 6/2016 | Lee | G06F 3/0418 345/173 |
| 2016/0179246 A1* | 6/2016 | Lee | G06F 3/044 345/174 |

* cited by examiner

FIG. 1

BACKGROUND SIGNAL PROCESSING SYSTEM AND BACKGROUND SIGNAL PROCESSING METHOD

BACKGROUND OF THE INVENTION

1. Field of the Invention

The present invention relates to background signal processing technologies, and, more specifically, to a background signal processing method and a background signal processing system used in a touch panel.

2. Description of Related Art

It is necessary to filter out the background noise in order to accurately detect the signal with a touch panel, particularly when used in capacitance type of touch panel, so as to prevent signal distortion. However, the background noise of the sensor is not constant. As a result, it is required to frequently detect the background noise and also update the background noise value, to ensure the quality of signals that are to be captured.

However, with the increasing size of the touch panel, the high precision requirement and so on, the numbers of sensors used in a touch panel must increase, such that the workloads for regularly detecting the background noise and updating information increase. Further, high frequently performing tasks for updating background noise in a system that is overloaded can adversely lower the reading frequency, leading to low performance for the touch panel, such as an interruption of signal when a continuous touch signal is being detected.

On the contrary, signal distortion may be resulted when the frequency of updating background noise is too low, and unaffordable workload for processing and updating background noise can adversely affect the reading frequency. Thus, there is an urgent need for developing a solution for reducing the workload of updating background noise as well as increasing the updating speed, so as to increase the reading frequency of signals.

SUMMARY OF THE INVENTION

In view of the foregoing prior art problems, the present invention provides a background signal processing method and a background signal processing system to reduce the burden of updating background noise so as to increase the speed with the quality assured signals being captured, for increasing the reading frequency of the touch penal frequency.

The present invention provides a background signal processing method, which is used in a sensor device having a plurality of conductive wires and a plurality of predetermined background signal thresholds and background base signal values, the background signal processing method comprising the following steps of: detecting a first background signal measurement value of a first conductive wire group in the conductive wires according to a first conductive wire number interval, beginning from an $n^{th}$ conductive wire, wherein n is a positive integer; determining whether the first background signal measurement value complies with the predetermined first background signal threshold, if yes, stopping in this step, otherwise, determining whether the first background signal measurement value complies with the predetermined second background signal threshold, if yes, updating the background signal, otherwise, detecting a second background signal measurement value of a second conductive wire group in the conductive wires according to the first conductive wire number interval, beginning from an $(n+m)^{th}$ conductive wire, wherein m is a positive integer; and calculating a background signal speculating value of a third conductive wire group in the conductive wires according to the first background signal measurement value and the second background signal measurement value, wherein the third conductive wire group is derived by excluding the first conductive wire group and the second conductive wire group.

The present invention provides a background signal processing system, which is used in a sensor device having a plurality of conductive wires and a plurality of predetermined background signal thresholds and background base signal values, the background signal processing system comprising: a storage unit that stores the background signal threshold; a measurement unit that detects a background signal measurement value of the conductive wires; and a determination module that determines whether the background signal measurement value complies with the background signal threshold.

Compared with the conventional technology, which measures the background signals of all the conductive wires, the present invention provides a background signal processing method and a background signal processing system, which measure some of the conductive wires: the first conductive wire group to obtain the first background signal measurement value, then determine whether a subsequent action is required according to the first background signal measurement value. If the first background signal measurement value complies with the first background signal threshold, the difference between the current background signal and the background base signal can be ignored. Therefore, remaining detection steps can be omitted. This greatly simplifies the updating steps for background signals and reduces the workload.

If subsequent actions are required, the background signal is updated according to the first background signal measurement value or a subsequent measurement is performed. If the first background signal measurement value complies with the second background signal threshold, the background signal is directly updated, or the second conductive wire group among all the conductive wires is measured to obtain a more accurate value. According to the second background signal measurement value obtained and first background signal measurement value obtained prior to that, a background signal speculating value of a third conductive wire group, other than the first conductive wire group and the second conductive wire group, in the conductive wires is calculated. Through setting the threshold to select an appropriate conductive wire number to be measured to calculate the signal speculating values of the remaining unmeasured conductive wires. This provides a complete accurate background signal to ensure reduced total workload as well as quality signal being captured.

BRIEF DESCRIPTION OF THE DRAWINGS

FIG. 1 is a schematic view showing the arrangement of conductive wires applied in a background signal processing method and a background signal processing system according to the present invention;

DETAILED DESCRIPTION OF THE PREFERRED EMBODIMENTS

Figure 2:
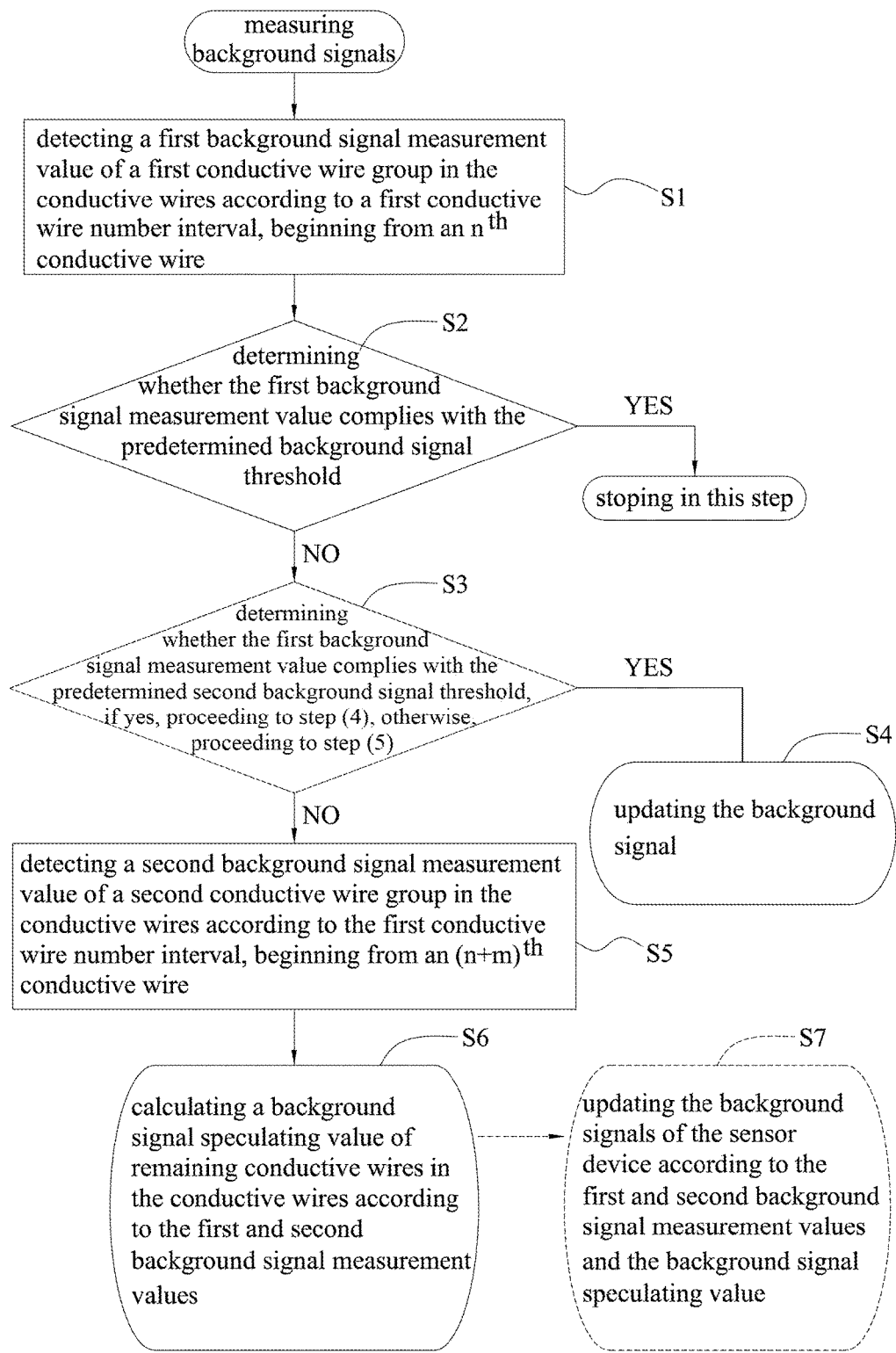
FIG. 2 is a flow chart of a background signal processing method according to the present invention.

The present invention is described in the following with specific embodiments, so that one skilled in the pertinent art can easily understand other advantages and effects of the present invention from the disclosure of the present invention.

Figure 1:
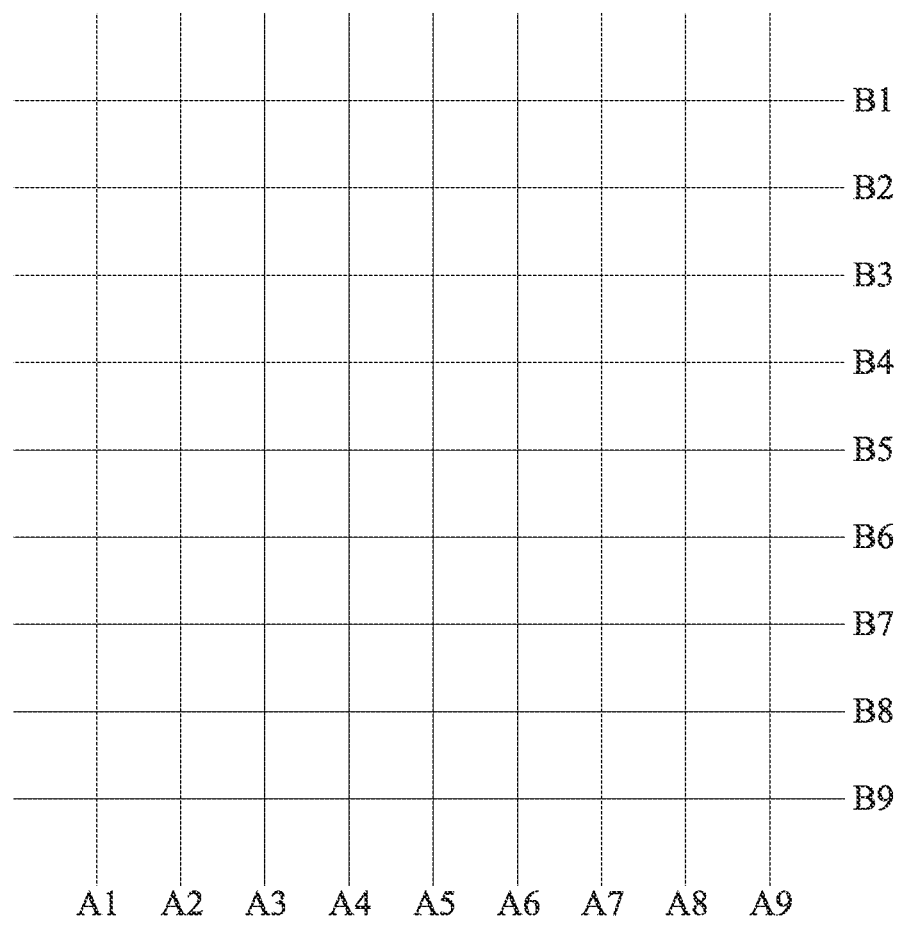

FIG. 1 is a schematic view showing the arrangement of conductive wires applied in a background signal processing method and a background signal processing system according to the present invention.

The background signal processing method according to the present invention can be applied in a sensor device having a plurality of conductive wires, such as a sensor device used in a touch panel. In an embodiment, the arrangement of a plurality of conductive wires can be used in a touch panel with capacitance type of sensor technology. As shown in FIG. 1, two conductive wire groups each comprise nine conductive wires are arranged in an orthogonal manner. The conductive wires arranged in rows are $A_1$-$A_9$, and the conductive wires arranged in columns are $B_1$-$B_9$. Each of the conductive wires can have both driving and sensing functions.

In an embodiment, the capacitive sensing technology is used to determine the location of the touch control signal. The method of capacitive sensing can be measuring the self capacitance and mutual capacitance from the conductive wires. Take the conductive wires arrangement in FIG. 1, when the self capacitance of the conductive wires $A_1$-$A_9$ are measured, conductive wires $B_1$-$B_9$ are not driven, the sensor function of $A_1$-$A_9$ are respectively used to sensing the self capacitance. On the other hand, when measuring the mutual capacitance, firstly conductive wire $A_1$, then conductive wires $B_1$-$B_9$ are driven, as well as using the sensor function of $A_1$ to sense the mutual capacitance with respect to the conductive wires $B_1$-$B_9$, after that, repeat the same steps for conductive wires $A_2$-$A_9$, respectively to obtain the mutual capacitance of the conductive wire $A_1$-$A_9$ with respect to the conductive wires $B_1$-$B_9$, and so on. Moreover, the background signal processing method and system proposed by the present invention can be simultaneously used for the measuring method for self capacitance and mutual capacitance.

The sensor device may be configured to have a plurality of predetermined background signal thresholds. In an embodiment, after the sensor device has performed a plurality of (e.g., 10 to 30 times) complete set of background signal measurement in an isolated electromagnetic compatibility (EMC) environment, a set of base signal, including the average value and standard deviation of the background signal, is obtained using a static method, which is used as the basis for updating the background signal, and according to the background base signal to determine the background signal thresholds. For instance, the background signal thresholds can be the absolute value of the difference of the two (or more than two) standard values of the background base signals.

FIG. 2 is a flow chart of a background signal processing method according to the present invention. The background signal processing method comprises the following steps of:

(S1) detecting a first background signal measurement value of a first conductive wire group in the conductive wires according to a first conductive wire number interval, beginning from an $n^{th}$ n conductive wire, wherein n is a positive integer;

(S2) determining whether the first background signal measurement value complies with the predetermined first background signal threshold, if yes, stopping in this step, otherwise proceeding to step (3);

(S3) determining whether the first background signal measurement value complies with the predetermined second background signal threshold, if yes, proceeding to step (4), otherwise, proceeding to step (5);

(S4) updating the background signal;

(S5) detecting a second background signal measurement value of a second conductive wire group in the conductive wires according to the first conductive wire number interval, beginning from an $(n+m)^{th}$ conductive wire, wherein m is a positive integer; and (S6) calculating a background signal speculating value of a third conductive wire group in the conductive wires according to the first background signal measurement value and the second background signal measurement value, wherein the third conductive wire group is derived by excluding the first conductive wire group and the second conductive wire group.

In step (S1), n is a positive integer. Referring to FIGS. 1 and 2, take the configuration that two groups each having 9 conductive wires as an example. As shown in FIG. 1, when the conductive wires $A_1$-$A_9$ are measured, n can be made equal to 1, that is from conductive wire $A_1$, the first conductive wire number interval (for example 4) is used to detect conductive wires $A_1$-$A_9$, i.e., conductive wires $A_1$, $A_5$ and $A_9$, which are in the first conductive wire group, so as to obtain the first background signal measurement value.

In step (S2), the first background signal measurement value is to be determined whether it complies with the predetermined background signal threshold, so as to determine the current first background signal measurement value and whether the difference between the background base signals exceeds the predetermined permissible range. In an embodiment, the background signal threshold can be, but is not limited to, the absolute value of two standard value of the base signal. When the first background signal measurement value complies with the background signal threshold, it is indicated that the absolute value of the first background signal measurement value is smaller than the background signal threshold. If this condition is met, which means the difference of the base signals is still within the predetermined permissible range, updating or other actions are not required, and the method ends and enters a touch signal detecting mode. If the condition is not met, which means the difference between the base signals exceeds the predetermined permissible range, step (S3) follows.

In step (S3), whether the first background signal measurement value complies with the predetermined second background signal threshold is determined, so as to determine the next move to be updating or measuring more wires. In an embodiment, the second background signal threshold can be the absolute value of three (or more than three) standard difference values of the background base value. The background signal can be directly updated, when the first background signal measurement value complies with the second background signal threshold, meaning that the absolute value of the first background signal measurement value is smaller than the second background signal threshold, proceeding to step (S4). If the above condition is not met, meaning that the difference value between the background signal and the base signal exceeds the permissible range, proceeding to step (S5).

In step (S4), the first background base signal is modified according to the first background signal measurement value, in order to update all of the background signals of the sensor device. Then, the touch signal detecting mode can be entered.

In step (S5), m is a positive integer, for example 2. As shown in FIG. 1, in the embodiment of n=1, beginning from the $(n+m)^{th}$ conductive wire, i.e., from conductive wire $A_3$, the first conductive wire number interval (for instance 4) is used to detect conductive wires $A_1$-$A_9$, i.e., conductive wires $A_3$ and $A_7$, which are in the second conductive wire group, so as to obtain the second background signal measurement value.

In step (S6), according to the first background signal measurement value measured from conductive wires $A_1$, $A_5$ and $A_9$, and the second background signal measurement value measured from conductive wires $A_3$ and $A_7$, the background signal speculating value of the conductive wires $A_2$, $A_4$, $A_6$ and $A_8$ in the third conductive wire group outside of the $A_1$, $A_5$ and $A_9$ in the first conductive wire group and the $A_3$ and $A_7$ in the second conductive wire group can be obtained.

In the background signal processing method according to the present invention, through setting a plurality of background signal thresholds to select appropriate wire numbers, fewer wires are to be measured when the measured background signals comply with a predetermined permissible range, so as to reduce the system workload and increase the processing speed.

When the measured background signal is beyond the predetermined permissible range, more wires shall be measured to obtain a more detailed information for the background signal, through obtaining the background signals of all wires $A_1$-$A_9$ or the speculating values, for serving as the reference, in order to filter out the noise during the subsequent process of capturing the touch signals, thereby ensuring high accuracy and quality of the touch signals being captured. For instance, only conductive wires $A_1$, $A_3$, $A_5$, $A_7$ and $A_9$ are measured, as compared to all conductive wires in the prior art. In other words, only 5/9 of the conductive wires are measured, thereby greatly reducing the workload for updating the background noise, as well as increasing the updating speed.

In an embodiment, the background signal processing method according to the present invention further comprises step (S7) updating all of the background signals of the sensor device according to the first background signal measurement value, the second background signal measurement value and the background signal speculating value of a third conductive wire group as the new basis. Then, the touch signal detecting mode can be entered.

Figure 3:
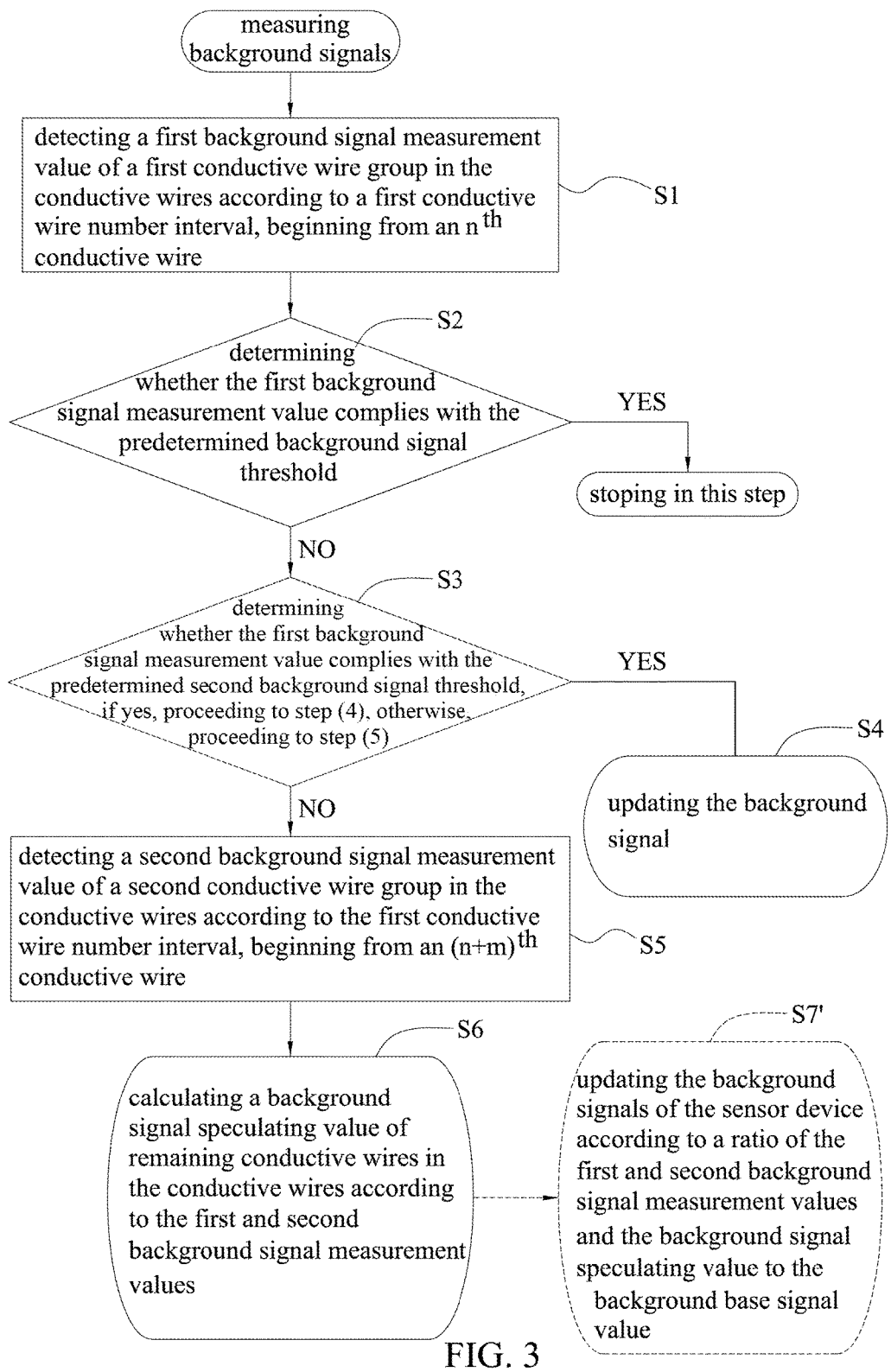
FIG. 3 is a flow chart of a background signal processing method of another embodiment according to the present invention.

Referring to FIG. 3, in another embodiment the background signal processing method further comprises the step of (S7') updating all of the background signals of the sensor device according to a ratio of the first background signal measurement value, the second background signal measurement value and the background signal speculating value of the third conductive wire group to the background base signal, that is multiplying the background base signal with the ratio, to calculate the background signals of all the conductive wires for updating. Then, the touch signal detecting mode can be entered.

In an embodiment, the aforesaid step (S4) comprises the following steps of:

(4-1) calculating a ratio between first background signal measurement value and background signal base value; and (4-2) updating all of the background signals of the sensor device according to the ratio, and then entering the touch signal detecting mode. Through the ratio between the first background signal measurement value and the background signal base value, that is multiplying the background base value by the ratio, the background signal for all wires can be calculated for the updating.

In the aforesaid step (S6) of one embodiment, the background speculating value of the third wire group is calculated by interpolation method, such as lagrange interpolation, spline interpolation or other interpolation method. Take the aforementioned embodiment of measuring of the wires $A_1$-$A_9$ as an example, the background signal measurement value of the wires $A_1$ and $A_3$ are used to calculate the background signal speculating value of wire $A_2$ using linear interpolation method; or use the background signal measurement value of wire $A_3$ and $A_5$, to calculate the background signal speculating value of wire $A_4$ using linear interpolation method, and so on.

Figure 4:
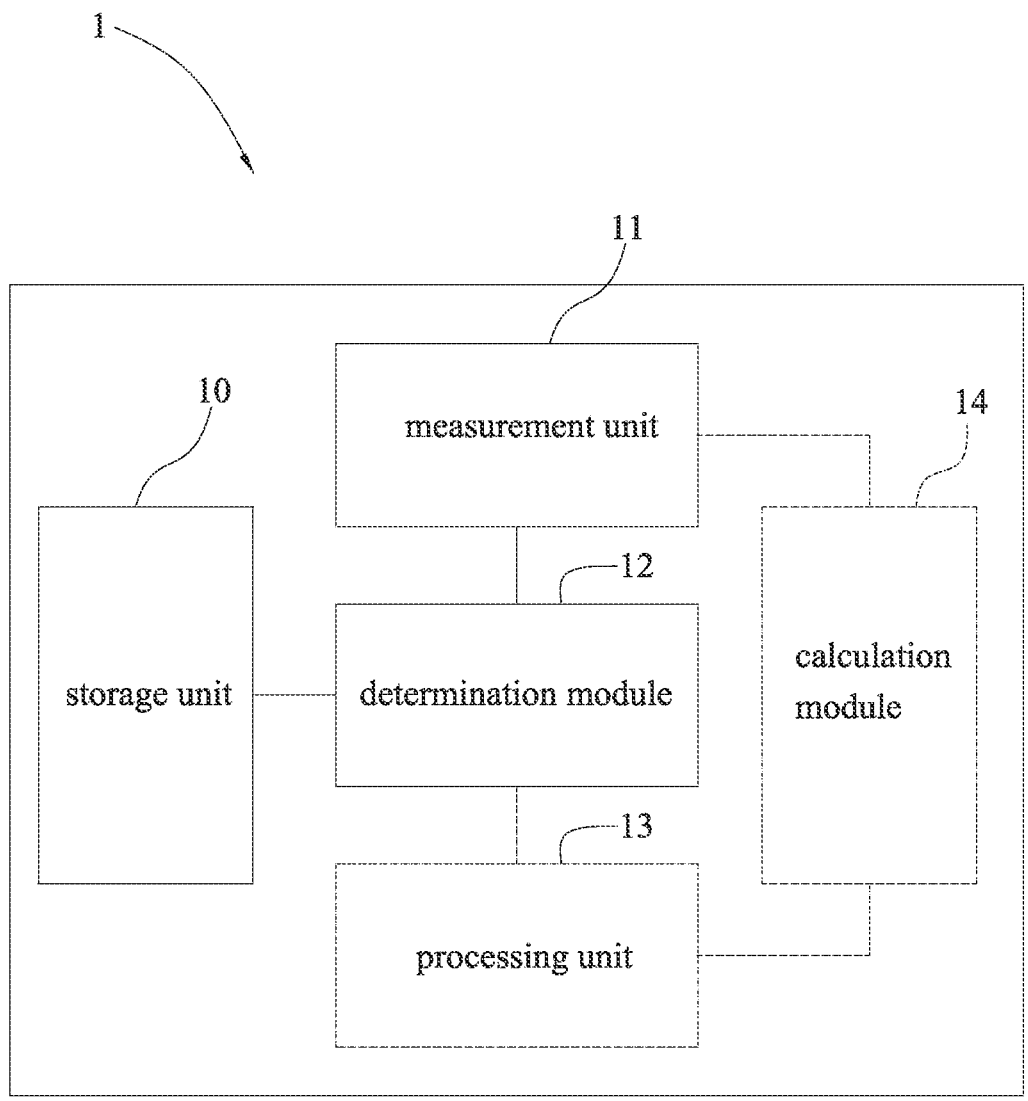
FIG. 4 is a functional block diagram of a background signal processing system according to the present invention.

FIG. 4 is a functional block diagram of a background signal processing system 1 according to the present invention. The background signal processing system 1 can be applied in a sensor device having a plurality of conductive wires. The sensor device comprises a plurality of predetermined background signal thresholds and background base signal values. The background signal processing system 1 comprises a storage unit 10, a measurement unit 11 and a determination module 12, and a processing unit 13 or a calculation module 14, optionally.

The storage unit 10 is used to store the background signal threshold, which is determined by the base signal.

The measurement unit 11 is used to detect the background signal measurement value of the conductive wires.

The determination module 12 is used to determine whether the background signal measurement value complies with the background signal threshold. In an embodiment, the background signal threshold can be the absolute value of two standard difference value of the base signal. When the background signal measurement value complies with the threshold, it is indicated that the absolute value of the background signal measurement value is smaller than the threshold.

In an embodiment, the sensor device comprises a first background threshold and a second background signal threshold that is higher than the first background threshold. For instance, the first background threshold is the absolute value of the two standard difference values of the background base signal, and the second background signal threshold is the absolute value of the absolute values of the three standard difference values of the background base signal. In an embodiment, the determination module 12 further generates a background signal updating signal when the background signal measurement value does not comply with the first background signal threshold, but complies with the second background signal threshold, which indicates that the absolute value of the background signal measurement value is greater than the first background signal threshold, but less than the second background signal threshold. The background signal processing system 1 can optionally includes a processing unit 13 that updates the background signals after receiving the first background signal updating information.

In an embodiment, the processing unit 13 further calculates the ratio between the background signal measurement value and the background base signal value. The ratio is used to update the background signal value.

In an embodiment, the sensor device comprises a first background signal threshold and a second background threshold that is higher than the first background signal threshold. The determination module 12 further used sends the second background signal updating instructions when the background signal measurement value does not comply with the second background base signal value. The background signal processing system 1 can optionally comprise a processing unit 13 for updating the background signals after receiving the second background signal updating information In an embodiment, the background signal processing system 1 can be applied in a sensor device having a plurality of conductive wires arranged in an orthogonal manner, as shown in FIG. 1.

In an embodiment, the measurement unit 11 can be used to detect the first background signal measurement value of the first conductive wire group in the conductive wires, beginning from the $n^{th}$ conductive wire, according to the first conductive wire number interval. The determination module 12 is used to determine whether the first background signal measurement value complies with the predetermined background signal threshold, wherein n is a positive integer. The determination module 12 determines whether the first background signal measurement value complies with the predetermined first background signal threshold. The determination module 12, when determining that the first background signal measurement value does not comply with the first background signal threshold, further determines whether the first background signal measurement complies with the predetermined second background signal threshold.

When the determination module 12 determines that the first background signal measurement value does not comply with the second background threshold, the measurement unit 11 can be used to, when the first background signal measurement value does not comply with the predetermined background signal threshold, detect the second background signal measurement value of the second conductive wire group in the plurality of conductive wires according to the first conductive wire number interval, beginning from the $(n+m)^{th}$ conductive wire, wherein m is a positive integer.

In an embodiment, the background signal processing system 1 can optionally includes a calculation module 14, which is used to calculate the background signal speculating value of the third conductive wire group, other than the first conductive wire group and the second conductive wire group, in the conductive wires according to the first background signal measurement value and the second background signal measurement value. Since the background signal measurement value or the background signal speculating value are obtained for all the conductive wires, the noise can be filtered out during the process of capturing the touch signals, for ensuring that the signals to be captured have high precision and high quality.

In an embodiment, the calculation module 14 is used to calculate the background signal of the third conductive wire group by an interpolation method, such as Lagrange interpolation, Spline interpolation or other interpolation method, so as to obtain the background signal speculating value.

In summary, the background signal processing method and the background signal processing system according to the present invention measure some of the conductive wires: the first conductive wire group to obtain the first background signal measurement value, then determine whether a subsequent action is required according to the first background signal measurement value, if the measurement value complies with the first background signal threshold, the difference between the current background signal and the background base signal can be omitted, such that the remaining other detection steps are omitted. This greatly simplifies the updating steps for background signal and reduces the workload.

If subsequent actions are required, updating or further measuring is determined according to the first background signal measurement value. If the first background signal measurement value complies with the second background signal threshold, the background signal is updated directly, or the second conductive wire group of all the conductive wires is measured, and the second background signal measurement value obtained and the first background signal measurement value obtained prior to that are used to calculate the background signal speculating value of the third conductive wire group, other than the first conductive wire group and the second conductive wire group, in the conductive wires. Through setting the threshold to select an appropriate conductive wire number to be measured to calculate the signal speculating values of the remaining unmeasured conductive wires, complete background signals can be provided. Therefore, the quality of the captured signals is ensured, and the workload of the background signals is reduced.

The present invention has been described using exemplary preferred embodiments. However, it is to be understood that the scope of the present invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A background signal processing method, which is used in a sensor device having a plurality of conductive wires and a plurality of predetermined background signal thresholds and background base signal values, the background signal processing method comprising the following steps of:
   (1) detecting a first background signal measurement value of a first conductive wire group in the conductive wires according to a first conductive wire number interval, beginning from an $n^{th}$ conductive wire, wherein n is a positive integer;
   (2) determining whether the first background signal measurement value complies with a predetermined first background signal threshold, if yes, stopping in this step, otherwise, proceeding to step (3);
   (3) determining whether the first background signal measurement value complies with a predetermined second background signal threshold, if yes, proceeding to step (4), otherwise, proceeding to step (5);
   (4) updating a background signal;
   (5) detecting a second background signal measurement value of a second conductive wire group in the conductive wires according to the first conductive wire number interval, beginning from an $(n+m)^{th}$ conductive wire, wherein m is a positive integer; and
   (6) calculating a background signal speculating value of a third conductive wire group in the conductive wires according to the first background signal measurement value and the second background signal measurement value, wherein the third conductive wire group is derived by excluding the first conductive wire group and the second conductive wire group.

2. The background signal processing method of claim 1, further comprising the step of:

(7) updating a background signal of the sensor device according to the first background signal measurement value, the second background signal measurement value and the background signal speculating value.

3. The background signal processing method of claim 1, further comprising:

(7') updating a background signal of the sensor device according to a ratio of the first background signal measurement value, the second background signal measurement value and the background signal speculating value to the background signal.

4. The background signal processing method of claim 1, wherein step (4) further comprises:

(4-1) calculating a ratio between the first background signal measurement value and the background base signal values; and (4-2) updating the background signal according to the ratio.

5. The background signal processing method of claim 1, wherein the conductive wires are arranged in an orthogonal manner.

6. The background signal processing method of claim 1, wherein in step (6) the background signal speculating value of the third conductive wire group is calculated by an interpolation method.

* * * * *